(12) United States Patent
Atkinson

(10) Patent No.: US 6,716,280 B2
(45) Date of Patent: Apr. 6, 2004

(54) STARCH-BASED CORRUGATING ADHESIVE COMPOSITIONS

(76) Inventor: Jeffrey G. Atkinson, 75 Bay Cir. Dr., Holland, MI (US) 49424

( * ) Notice: Subject to any disclaimer, the term of this patent is extended or adjusted under 35 U.S.C. 154(b) by 253 days.

(21) Appl. No.: 09/912,867

(22) Filed: Jul. 25, 2001

(65) Prior Publication Data

US 2003/0019397 A1 Jan. 30, 2003

(51) Int. Cl.[7] .................. C08L 3/00; C09D 103/00; C09J 103/00; C08B 30/12; C13F 3/00
(52) U.S. Cl. .............. 106/217.2; 106/206.1; 106/211.1; 127/29; 127/32; 127/33
(58) Field of Search ............ 106/217.2, 206.1, 106/211.1; 127/29, 32, 33

(56) References Cited

U.S. PATENT DOCUMENTS

| | | | |
|---|---|---|---|
| 4,018,959 A | 4/1977 | Demko et al. | 428/182 |
| 4,359,341 A | 11/1982 | Allen | 106/213 |
| 4,366,275 A | 12/1982 | Silano et al. | 524/47 |
| 4,400,480 A | 8/1983 | Silano et al. | 524/47 |
| 4,424,291 A | 1/1984 | Leake et al. | 524/47 |
| 4,568,714 A | 2/1986 | Overholt | 524/25 |
| 4,677,145 A * | 6/1987 | Krankkala | 524/48 |
| 4,769,096 A | 9/1988 | Vander Giessen et al. | 156/69 |
| 4,787,937 A | 11/1988 | Leake | 106/213 |
| 4,814,039 A * | 3/1989 | Willging | 156/328 |
| 4,912,209 A | 3/1990 | Leake et al. | 536/102 |
| 4,978,411 A | 12/1990 | Leake et al. | 156/336 |
| 5,093,393 A * | 3/1992 | Faber et al. | 524/30 |
| 5,454,863 A * | 10/1995 | Foran et al. | 106/213 |
| 5,639,333 A * | 6/1997 | Krankkala | 156/328 |
| 5,641,349 A * | 6/1997 | Koubek et al. | 106/206.1 |

* cited by examiner

Primary Examiner—Mark L. Bell
Assistant Examiner—Patricia L. Hailey
(74) Attorney, Agent, or Firm—King & Jovanovic, PLC

(57) ABSTRACT

A starch-based corrugating adhesive composition comprising: at least one solvent; a carrier starch dispersed within the at least one solvent, wherein the carrier starch is undried; a raw starch dispersed within the at least one solvent; and wherein the starch-based corrugating adhesive composition comprises a pH of greater than approximately 7.

25 Claims, 1 Drawing Sheet

STARCH-BASED CORRUGATING ADHESIVE COMPOSITIONS

BACKGROUND OF THE INVENTION

1. Field of the Invention

The present invention relates in general to starch-based corrugating adhesive compositions, and more particularly, to starch-based corrugating adhesive compositions which, among other things, utilize an undried carrier starch as a component thereof.

2. Background Art

Adhesives for use in association with corrugating applications have been known in the art for years, and are the subject of numerous patents, including: U.S. Pat. No. 4,978,411 entitled "PROCESS OF USING STARCH BASED CORRUGATING ADHESIVES;" U.S. Pat. No. 4,912,209 entitled "STARCH BASED CORRUGATING ADHESIVES;" U.S. Pat. No. 4,787,937 entitled "HIGH SOLIDS CORRUGATING ADHESIVE;" U.S. Pat. No. 4,769,096 entitled "PROCESS OF BONDING FLUTED FILTER MEDIA TO END CAPS;" U.S. Pat. No. 4,568,714 entitled "CORRUGATING ADHESIVE COMPOSITION FOR ADHERING NORMALLY ADHERENT SURFACES;" U.S. Pat. No. 4,424,291 entitled "CORRUGATING ADHESIVE COMPOSITION AND PAPERBOARD PRODUCT PRODUCED THEREWITH;" U.S. Pat. No. 4,400,480 entitled "PROCESS FOR PREPARING CORRUGATED PAPERBOARD;" U.S. Pat. No. 4,366,275 entitled "WATER-RESISTANT ALKALINE CORRUGATING ADHESIVE COMPOSITION;" U.S. Pat. No. 4,359,341 entitled "STARCH BASED ADHESIVES AND METHOD THEREFORE;" and U.S. Pat. No. 4,018,959 entitled "CORRUGATING ADHESIVE COMPOSITION CONTAINING THERMOPLASTIC POLYMER, THERMOSETTING RESIN, AND STARCH" all of which are hereby incorporated herein by reference in their entirety.

U.S. Pat. Nos. 4,978,411, and 4,912,209 disclose starch-based alkaline corrugating adhesives and processes for using the same, which purportedly have improved green bond strength due to the use of undried starch as the raw (non-carrier) starch component in the adhesive. Such adhesives can purportedly be used in corrugation processes at much higher corrugator running speeds than conventionally employed adhesives.

U.S. Pat. No. 4,787,937 discloses an alkaline-curing, starch-based corrugating adhesive employing ungelatinized tapioca starch and a carrier comprising high amylose starch, wherein the total solids of the adhesive is from 30 to 45% solids by weight. The disclosed adhesives purportedly provide improved tack and corrugator running speeds.

U.S. Pat. No. 4,769,096 discloses a fluted filter media to end cap bonding process. The process comprises coating at least one end cap and/or at least one fluted edge of the filter media with a bonding composition, contacting the end cap with the edge of the fluted filter media, and curing the bonding composition coating to form a strong, continuous filter media to end cap bond. The bonding composition comprises, an adhesive latex, a thermoplastic resin, and an amount of ungelatinized granular starch effective to complex a major portion of the latex water during curing of the bonding composition.

U.S. Pat. No. 4,568,714 discloses an aqueous starch-based corrugating adhesive containing casein —a carboxylated styrene-butadiene copolymer latex. Preferably glyoxal is used to adhere liner and medium substrates having normally adherent surfaces.

U.S. Pat. No. 4,424,291 discloses a corrugating adhesive composition which purportedly exhibits superior tack performance by replacing, on a solids basis, from 5 to 100%, by weight, of the gelatinized starch carrier of a typical known starch-corrugating adhesive with a polymer containing at least 10%, by weight, of carboxyl groups derived from a polymerizable ethylenically unsaturated mono- or polycarboxylic acid or a mixture of these polymers.

U.S. Pat. Nos. 4,400,480 and 4,366,275 disclose a crosslinking additive for imparting water resistance to starch-based corrugating adhesive compositions which is prepared by: (a) reacting acetone and formaldehyde under aqueous alkaline conditions at 20 degrees to 80 degrees Centigrade in a molar ratio of 1 mole acetone to about 2 to 5.5 moles formaldehyde; (b) adding to the reaction mixture at least an effective amount of dihydroxyethylene urea to scavenge the free formaldehyde in the mixture; and (3) reacting until the amount of unreacted formaldehyde remaining is reduced to about 0.1–2%. The crosslinking additive thus obtained, which is low in free formaldehyde, may be added directly to a starch-based corrugating adhesive or may be first mixed with dimethylol dihydroxyethylene urea.

U.S. Pat. No. 4,359,341 discloses a process for preparing a carrier type starch which is characterized by the steps of mixing two starch portions having different gelatinization temperatures with water to form a slurry and causing gelatinization of the starch portion having the lower gelatinization temperature to thereby form a stable gelatinized carrier for the raw starch portion having the higher gelatinization temperature. The ratio of the starch portion having the lower gelatinization temperature to the starch portion having the higher gelatinization temperature is preferably of the order of from 1:10 to 1:4 and the ratio by weight of the starch portions to water is of the order of from 1:2 to 1:4, preferably about 1:3. A carrier type starch based adhesive comprising a mixture of a gelatinized carrier starch portion and a raw starch portion having a higher gelatinization temperature dispersed in the carrier portion is also disclosed.

U.S. Pat. No. 4,018,959 discloses improved adhesive compositions which are useful in the manufacturing of corrugated boards comprising a mixture of: (a) a crosslinkable water dispersible polymer, (b) an ungelatinized starch, (c) a urea-formaldehyde resin, (d) an acidic metal salt, and (e) water.

While the above-identified references do appear to provide operable adhesives for corrugating applications, their compositions do not efficiently utilize components which cost effectively facilitate adhesive uniformity, adhesive consistency, personnel reduction in adhesive production, and/or safety. For example, using dried starch as a carrier starch can materially increase overall adhesive costs because the energy necessary to run dryers is substantial, which in a low margin industry becomes significant.

It is therefore an object of the present invention to provide a starch-based corrugating adhesive composition having an undried carrier starch as a component thereof, which, among other things, remedies the aforementioned detriments and/or complications associated with the use of the above-identified corrugating adhesives.

SUMMARY OF THE INVENTION

The present invention is directed to a starch-based corrugating adhesive composition comprising: (a) at least one solvent, such as water; (b) a carrier starch dispersed within the at least one solvent, wherein the carrier starch is undried; (c) a raw starch dispersed within the at least one solvent; and (d) wherein the starch-based corrugating adhesive composition comprises a pH of greater than approximately 7.

In a preferred embodiment of the present invention, the at least one solvent is present in a concentration ranging from approximately 60 percent to approximately 85 percent by weight of the total adhesive composition.

In another preferred embodiment of the present invention, the carrier starch may be viscosity modified (by e.g. cooking, peptizing, acid hydrolysis, oxidation, etc.), at least partially cooked, peptized, and combinations thereof.

In yet another preferred embodiment of the present invention, the carrier starch is selected from the group consisting of undried corn starch, undried tapioca starch, undried rice starch, undried potato starch, undried wheat starch, undried sago starch, and mixtures thereof. In this embodiment, the carrier starch may comprise undried starch milk and/or the carrier starch may be exposed to ambient temperature and pressure, and therefore "air dried."

Preferably, the carrier starch is selected from the group consisting essentially of native corn starch, hybrid amylose corn starch, hybrid amylopectin corn starch, and mixtures thereof.

In another aspect of the present invention, the carrier starch is present in a concentration ranging from approximately 2.5 percent to approximately 18 percent by weight of the total starch composition, and more preferably from approximately 3 percent to approximately 7.5 percent by weight of the total starch composition.

In accordance with the present invention, the raw starch may be dried or undried, and, similarly to the carrier starch, selected from the group consisting of undried corn starch, undried tapioca starch, undried wheat starch, undried potato starch, undried wheat starch, undried sago starch, and mixtures thereof.

In a preferred embodiment of the present invention, the raw starch is present in a concentration ranging from approximately 15 percent to approximately 95 percent by weight of the total starch composition, and more preferably from approximately 70 percent to approximately 85 percent by weight of the total starch composition.

The present invention also discloses incorporating a basic additive into the adhesive composition, such as LiOH, NaOH, KOH, RbOH, CsOH, FrOH, Be(OH)$_2$, Mg(OH)$_2$, Ca(OH)$_2$, Sr(OH)$_2$, Ba(OH)$_2$, Ra(OH)$_2$, and mixtures thereof. In this embodiment, the basic additive is preferably present in a concentration ranging from approximately 0.1 percent to approximately 2 percent by weight of the total adhesive composition.

The present invention further discloses incorporating borax and/or boric acid into the adhesive composition. In this embodiment, the borax and/or boric acid is present in a concentration ranging from approximately 0.1 percent to approximately 2 percent by weight of the total adhesive composition.

In a preferred embodiment of the present invention, the ratio of raw starch to carrier starch ranges from approximately 3/1 to approximately 25/1 by weight of the total adhesive composition and/or the total solid content of the adhesive composition ranges from approximately 15 percent to approximately 40 percent by weight based on the total weight of the mixture.

The present invention is also directed to a starch-based corrugating adhesive composition comprising: (a) at least one solvent; (b) a carrier starch dispersed within the at least one solvent, wherein the carrier starch is undried; (c) a raw starch dispersed within the at least one solvent, wherein the carrier starch is undried; and (d) wherein the starch-based corrugating adhesive composition comprises a pH of greater than approximately 7.

The present invention is further directed to a starch-based corrugating adhesive composition comprising: (a) at least one solvent, wherein the at least one solvent comprises water, and further wherein the at least one solvent is present in a concentration ranging from approximately 60 percent to approximately 85 percent by weight of the total adhesive composition; (b) a carrier starch dispersed within the at least one solvent, wherein the carrier starch is undried, and further wherein the carrier starch is at least partially cooked, peptized, and combinations thereof, and further wherein the carrier starch is present in a concentration ranging from approximately 2.5 percent to approximately 18 percent by weight of the total starch composition; (c) a raw starch dispersed within the at least one solvent, wherein the raw starch is present in a concentration ranging from approximately 15 percent to approximately 95 percent by weight of the total starch composition; and (d) wherein the starch-based corrugating adhesive composition comprises a pH of greater than approximately 7.

BRIEF DESCRIPTION OF THE DRAWINGS

The invention will now be described with reference to the drawings wherein.

DETAILED DESCRIPTION OF THE INVENTION

Figure 1:
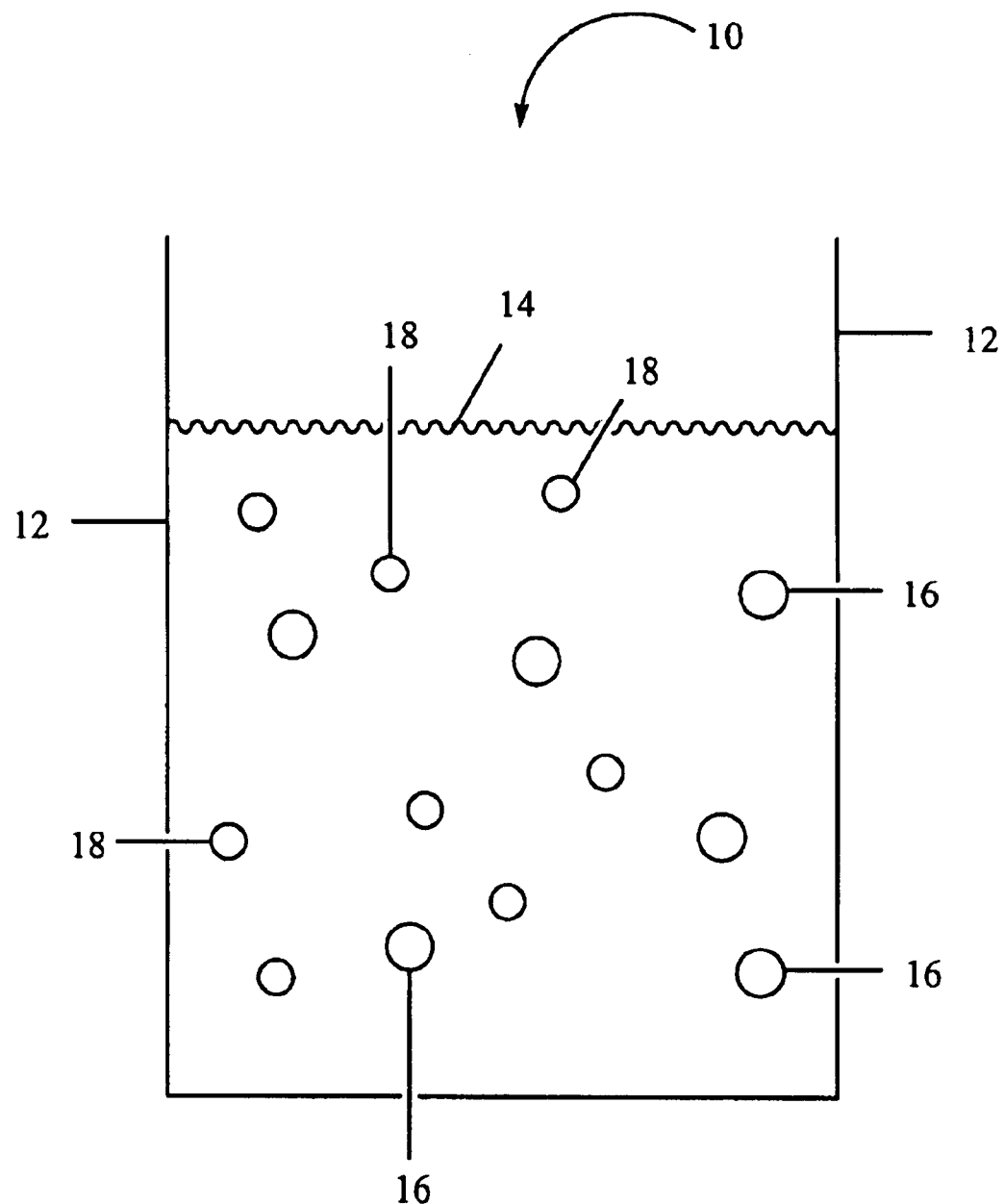
FIG. 1 of the drawings is a schematic representation of a starch-based corrugating adhesive composition in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the drawings, and to FIG. 1 in particular, a schematic representation of a first embodiment of starch-based corrugating adhesive composition 10 is shown in container 12 as generally comprising: solvent 14, carrier starch 16, and raw starch 18. It will be understood that FIG. 1 is merely a schematic representation of corrugating adhesive composition 10. As such, some of the components may be distorted from their actual scale for pictorial clarity. As will be explained in greater detail below, carrier starch 16 is undried, thereby facilitating adhesive uniformity, adhesive consistency, personnel reduction in adhesive production, increased safety, and/or adhesive cost reduction. Cost reduction can be substantial inasmuch as undried starch can be obtained, as a byproduct or waste, from any one of a number of wet-milling manufacturing facilities.

For purposes of the present disclosure, solvent 14 comprises water. However, it will be understood that solvent 14 may be selected from any one of a number of polar and/or non-polar solvents that would be known to those with ordinary skill in the art having the present disclosure, including miscible and non-miscible combinations of both. Examples include alcohols, glycols, carbonates, ethers, alkanes, alkenes, carbonyls, such as ketones, esters—just to name a few. Preferably, solvent 14 is present in a concentration ranging from approximately 60 percent to approximately 85 percent by weight of the total adhesive composition.

Referring once again to FIG. 1, carrier starch 16 is dispersed within solvent 14, and is undried. It will be understood that regardless of its ordinary meaning, the term "undried" will herein be inclusive of aqueous starch dispersions, such as undried starch milk, which have never been dried, and starches which have been dewatered and/or air-dried at ambient temperature (i.e. approximately 50 to approximately 100 degrees Fahrenheit).

Carrier starch 16, may be selected from any starch suitable for use in corrugating adhesives. Preferred starches are corn, tapioca, wheat, potato, sago, rice, and mixtures thereof, with corn and tapioca starches being the most preferred. Examples of commercial sources for carrier starch 16 include any wet milling plant which incorporates one or more of the above-identified materials into their manufacturing and/or refining processes, such as, for example, CPC of Stockton, Calif., or Joliet, Ill., National Starch & Chemical Co. of Indianapolis, Ind.

Mixtures of these starches and other starches are also useful, with the sole criterion for use being the requirement that the carrier starch(es) be undried. Furthermore, carrier starch 16 may comprise any one of a number of straight or branched configurations, such as hybrid amylose starch, hybrid amylopectin starch, and mixtures thereof.

Typical forms of undried starches include starch milks (aqueous dispersions of carrier starches) and starches air-dried at ambient temperature. Such starches also include dewatered starches (i.e. starches which are filtered from aqueous dispersion by gravity, vacuum filtration, and/or centrifugation). In fact, it appears that the primary criterion for such "undried" starches is that they not be subjected to the elevated temperatures realized during commercial starch drying processes.

For purposes of the present disclosure, carrier starch 16 may be viscosity modified (by e.g. cooking, peptizing, acid hydrolysis, oxidation, etc), at least partially cooked, peptized, and combinations thereof.

Depending upon the particular adhesive composition configuration, the concentration of carrier starch 16 preferably ranges from approximately 2.5 percent to approximately 18 percent by weight of the total starch composition, and more preferably ranges from approximately 3 percent to approximately 7.5 percent by weight of the total starch composition.

As is shown in FIG. 1, raw starch 18 is dispersed within solvent 14, and, similarly to carrier starch 16, may be selected from any starch suitable for use in corrugating adhesives. Preferred starches are corn, tapioca, wheat, potato, sago, rice, and mixtures thereof, with corn and tapioca starches being the most preferred. Raw starch 18 may comprise dried and/or undried starch, and is preferably present in a concentration ranging from approximately 15 percent to approximately 95 percent by weight of the total starch composition.

For purposes of the present disclosure, the ratio of raw starch 18 to carrier starch 16 may range from approximately 3/1 to approximately 25/1 by weight of the total adhesive composition.

In accordance with the present invention, starch-based corrugating adhesive composition 10 is alkaline or basic, and, therefore, comprises a pH of greater than approximately 7—which can be adjusted using a conventional acid/base pH modifier/additive.

In a preferred embodiment of the present invention, starch-based corrugating adhesive composition 10 includes a basic additive at least partially dissolved in the at least one solvent. Examples of some preferred basic additives may include, LiOH, NaOH, KOH, RbOH, CsOH, FrOH, Be(OH)$_2$, Mg(OH)$_2$, Ca(OH)$_2$, Sr(OH)$_2$, Ba(OH)$_2$, Ra(OH)$_2$, and mixtures thereof. Of course, other basic additives may be employed in partial or full replacement of the above-identified hydroxides as the particular application dictates, including alkali metal carbonates, such as sodium carbonate, and alkali metal silicates, such as sodium silicate. Preferably, the basic additive is present in a concentration ranging from approximately 0.1 percent to approximately 2 percent by weight of the total adhesive composition.

In addition to the basic additive, some adhesive applications are enhanced upon incorporation of borax and/or boric acid which may be at least partially dissolved in solvent 14. If borax and/or boric acid is utilized, it is preferably present in a concentration ranging from approximately 0.1 percent to approximately 2 percent by weight of the total adhesive composition.

It will be understood that other components may be included in starch-based corrugating adhesive composition 10, such as, for example, wetting agents, proteins, placticizers, cross-linking resins, solubilizing agents, insolubilizing agents, rheology modifiers, water conditioners, penetration control agents, peptizers such as urea, gelatinization temperature modifiers, inert fillers such as clay and finely ground polymers, thickeners such as inorganic colloidal clay, guar, hydroxyethyl cellulose, alginates, polyvinyl alcohol, polymers of ethylene oxide and the like, wet strength resins, and emulsions such as polyvinyl acetate.

In accordance with the present invention, the total solid content of the adhesive composition may range from approximately 15 percent to approximately 40 percent by weight based on the total weight of the mixture.

The corrugating adhesives of the present invention can be prepared by any standard method so long as elevated temperature drying of the carrier starch is not utilized. In a preferred method, the undried carrier starch is first viscosity modified upon gelatinization (cooked) in a portion of the water with the basic additive to provide the carrier component of the adhesive. The raw starch slurry may be prepared by mixing the raw starch, borax, and remaining water. The carrier and raw starch mixture can then be combined to form the final adhesive. Optional ingredients, if desired, can be added at any convenient point during the preparation of either component but are usually added to the finished adhesive.

The prepared adhesive can be used to bond single, double, or triple-faced boards using any equipment which is presently employed for the preparation of corrugated board. In general, starch-based corrugating adhesive composition 10 may be maintained at a temperature preferably between approximately 25 and approximately 55 degrees Centigrade before its application to the protruding tips of the fluted paper strip. The actual application may be accomplished by the use of glue applicators which are ordinarily employed in most corrugating machines, or one may utilize other application methods which may be able to achieve a different distribution of adhesive. Following the application of the adhesive of the fluted paper strip, the latter is then brought into immediate contact with the facing bond under the influence of heat and pressure, as is well known in the art. A double-faced board may be subsequently prepared by bringing a second facing in contact with the open fluted surface of the single-faced board by the usual procedures.

In support of the present invention, starch-based corrugating adhesive composition 10 may be fabricated according to the following example.

EXAMPLE 1

A starch-based corrugating adhesive composition can be prepared using the following one tank method. First, approximately 280 gallons of water are charged into a retaining vessel. Second, approximately 220 pounds of undried carrier starch (approximately 5–15 water content) are charged into the retaining vessel, whereupon agitation is initiated and the vessel is heated to approximately 125 degrees Fahrenheit for approximately 10 minutes. Third, approximately 30 pounds of sodium hydroxide flakes are charged into the retaining vessel. Fourth, approximately 290 gallons of cold water are charged into the retaining vessel. Fifth, the retaining vessel is reheated to approximately 100 degrees Fahrenheit, whereupon approximately 12 pounds of dry borax (5 mol) are charged into the retaining vessel. Next, approximately 1200 pounds of dry raw starch are charged into the retaining vessel with an additional 12 pounds of dry borax. The resulting composition is agitated for approximately 20 minutes or until a smooth consistency is realized—which largely depends upon the efficiency of the agitator. Once complete, the starch-based corrugating adhesive composition may be stored, or, alternatively, immediately incorporated into production. It will be understood that while a one tank method has been disclosed, a conventional multi-tank method is likewise contemplated for use in accordance with the present invention.

It will be understood that the term "total adhesive composition" is herein defined as including all solutes, particles, and solvents of the adhesive composition. It will be further understood that the term "total starch composition" is herein defined as including only the carrier and raw starch materials.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A starch-based corrugating adhesive composition, comprising:
   at least one solvent;
   a carrier starch dispersed within the at least one solvent, wherein the carrier starch is undried;
   a raw starch dispersed within the at least one solvent; and
   wherein the starch-based corrugating adhesive composition comprises a pH of greater than approximately 7.

2. The starch-based corrugating adhesive composition according to claim 1, wherein the at least one solvent comprises water.

3. The starch-based corrugating adhesive composition according to claim 1, wherein the at least one solvent is present in a concentration ranging from approximately 60 percent to approximately 85 percent by weight of the total adhesive composition.

4. The starch-based corrugating adhesive composition according to claim 1, wherein the carrier starch is viscosity modified, at least partially cooked, peptized, and combinations thereof.

5. The starch-based corrugating adhesive composition according to claim 1, wherein the carrier starch is selected from the group consisting of undried corn starch, undried tapioca starch, undried rice starch, undried potato starch, undried wheat starch, undried sago starch, and mixtures thereof.

6. The starch-based corrugating adhesive composition according to claim 1, wherein the carrier starch comprises undried starch milk.

7. The starch-based corrugating adhesive composition according to claim 1, wherein the carrier starch is air-dried at ambient temperature.

8. The starch-based corrugating adhesive composition according to claim 1, wherein the carrier starch is selected from the group consisting essentially of native corn starch, hybrid amylose corn starch, hybrid amylopectin corn starch, and mixtures thereof.

9. The starch-based corrugating adhesive composition according to claim 1, wherein the carrier starch is present in a concentration ranging from approximately 2.5 percent to approximately 18 percent by weight of the total starch composition.

10. The starch-based corrugating adhesive composition according to claim 1, wherein the carrier starch is present in a concentration ranging from approximately 3 percent to approximately 7.5 percent by weight of the total starch composition.

11. The starch-based corrugating adhesive composition according to claim 1, wherein the raw starch is dried.

12. The starch-based corrugating adhesive composition according to claim 1, wherein the raw starch is undried.

13. The starch-based corrugating adhesive composition according to claim 1, wherein the raw starch is selected from the group consisting of undried corn starch, undried tapioca starch, undried rice starch, undried potato starch, undried wheat starch, undried sago starch, and mixtures thereof.

14. The starch-based corrugating adhesive composition according to claim 1, wherein the raw starch is present in a concentration ranging from approximately 15 percent to approximately 95 percent by weight of the total starch composition.

15. The starch-based corrugating adhesive composition according to claim 1, further comprising a basic additive at least partially dissolved in the at least one solvent.

16. The starch-based corrugating adhesive composition according to claim 15, wherein the basic additive is selected from the group consisting of LiOH, NaOH, KOH, RbOH, CsOH, FrOH, $Be(OH)_2$, $Mg(OH)_2$, $Ca(OH)_2$, $Sr(OH)_2$, $Ba(OH)_2$, $Ra(OH)_2$, and mixtures thereof.

17. The starch-based corrugating adhesive composition according to claim 16, wherein the basic additive is present in a concentration ranging from approximately 0.1 percent to approximately 2 percent by weight of the total adhesive composition.

18. The starch-based corrugating adhesive composition according to claim 1, further comprising borax or boric acid at least partially dissolved in the at least one solvent.

19. The starch-based corrugating adhesive composition according to claim 18, wherein the borax or boric acid is present in a concentration ranging from approximately 0.1 percent to approximately 2 percent by weight of the total adhesive composition.

20. The starch-based corrugating adhesive composition according to claim 1, wherein the ratio of raw starch to carrier starch ranges from approximately 3/1 to approximately 25/1 by weight of the total adhesive composition.

21. The starch-based corrugating adhesive composition according to claim 1, wherein total solid content of the adhesive composition ranges from approximately 15 percent to approximately 40 percent by weight based on the total weight of the composition.

22. A starch-based corrugating adhesive composition, comprising:

at least one solvent;

a carrier starch dispersed within the at least one solvent, wherein the carrier starch is undried;

a raw starch dispersed within the at least one solvent, wherein the carrier starch is undried; and wherein the starch-based corrugating adhesive composition comprises a pH of greater than approximately 7.

23. A starch-based corrugating adhesive composition, comprising:

at least one solvent, wherein the at least one solvent comprises water, and further wherein the at least one solvent is present in a concentration ranging from approximately 60 percent to approximately 85 percent by weight of the total adhesive composition;

a carrier starch dispersed within the at least one solvent, wherein the carrier starch is undried, and further wherein the carrier starch is at least partially cooked, peptized, and combinations thereof, and further wherein the carrier starch is present in a concentration ranging from approximately 2.5 percent to approximately 18 percent by weight of the total starch composition;

a raw starch dispersed within the at least one solvent, wherein the raw starch is present in a concentration ranging from approximately 15 percent to approximately 95 percent by weight of the total starch composition; and wherein the starch-based corrugating adhesive composition comprises a pH of greater than approximately 7.

24. The starch-based corrugating adhesive composition according to claim 23, wherein the ratio of raw starch to carrier starch ranges from approximately 3/1 to approximately 25/1 by weight of the total adhesive composition.

25. The starch-based corrugating adhesive composition according to claim 23, wherein total solid content of the adhesive composition ranges from approximately 15 percent to approximately 40 percent by weight based on the total weight of the mixture.

* * * * *

UNITED STATES PATENT AND TRADEMARK OFFICE
CERTIFICATE OF CORRECTION

PATENT NO. : 6,716,280 B2 Page 1 of 1
DATED : April 6, 2004
INVENTOR(S) : Atkinson It is certified that error appears in the above-identified patent and that said Letters Patent is hereby corrected as shown below:

Column 4,
Line 4, delete "carrier" and substitute -- raw --.
Line 15, after "starch is" insert -- viscosity modified, --.

Column 9,
Line 10, delete "carrier" and substitute -- raw --.
Line 23, after "starch is" insert -- viscosity modified, --.

Signed and Sealed this

Sixth Day of July, 2004

JON W. DUDAS
*Acting Director of the United States Patent and Trademark Office*